UNITED STATES PATENT OFFICE.

FRANKLIN OSGOOD, OF NEW YORK, N. Y.

IMPROVEMENT IN TREATING ZINC DROSS AND SKIMMINGS FOR THE MANUFACTURE OF PIGMENTS.

Specification forming part of Letters Patent No. 138,685, dated May 6, 1873; application filed April 26, 1873.

*To all whom it may concern:*

Be it known that I, FRANKLIN OSGOOD, of the city, county, and State of New York, have made a new and useful Improvement in the Manufacture of Zinc-White and Zinc-Lead from Ammoniacal Dross and Skimmings from the galvanizing process; and I hereby declare the following to be a full and exact description of the same.

The waste products from the process of galvanizing iron known as ammoniacal skimmings have heretofore been utilized in two ways—viz., first, washing out the ammonia salts together with the soluble salts of zinc and then precipitating the oxide of zinc by means of lime or an alkali and separating and collecting the ammonia; the residue has then in some instances been heated in a muffle or retort to convert it into zinc; second, the whole of the skimmings have been washed, dried, and mixed with coal in a retort and distilled to produce zinc or oxide. The first process involves a great deal of chemical manipulating, and with the exception of saving the ammonia and producing certain zinc salts to be used in coating metals has not been useful. The oxide of zinc when made is too impure to be merchantable.

Now, my invention consists in treating the ammoniacal skimmings by a dry process so as to separate those parts which would injure the oxide, and mixing the metallic zinc and oxide of zinc with fine coal and then heating in a suitable furnace so as to pass through or over it a stream of air, and thus produce and carry off the oxide of zinc, which may then be cooled and collected in chambers by the bag process in the usual way of collecting oxide when made directly from the ore. This produces a very pure white merchantable article of zinc oxide.

The object of the processes heretofore used has been mainly to recover the ammonia and to produce certain salts of zinc, and sometimes also to produce metallic zinc and oxide; but as the latter is contaminated with the products which are mixed with the oxide it is not valuable as a pigment.

The object of my invention is not so much to recover the ammonia as to remove from the dross or skimmings all acids, gases, and impurities so as to reduce them to such a condition that they may be treated for oxide of zinc by heating them in a furnace with coal and pass a stream of air through or over the heated mass to form and carry over the oxide.

The following description will enable others to use my invention.

I take the dross or ammoniacal skimmings from the galvanizing process, or the residuum if it has been washed for separating the soluble portions, and crush or grind it, and then run it through a fine sieve, say, one having forty holes to the square inch. Thus are separated the zinc salts, and any metallic zinc, since the zinc compounds are pulverized by the grinding and so pass through the sieve, while the metal is only flattened and will not pass through the meshes of the sieve. The metal is then ready to be made into oxide or used again as metallic zinc. The other portion, containing the zinc salts or compounds, I place in a roasting-furnace and subject it to sufficient heat to drive off any combined acids or gases. I prefer, however, to expose the powder to the air for a few days before roasting; but this is not essential. When this operation of roasting is completed, I have in the furnace a mixture composed of a dark oxide of zinc, some impurities, and some metallic zinc. This material is then ready to be mixed with coal or braze in a furnace and converted into oxide of zinc by any of the methods now in use for that purpose. It may be mixed with metallic zinc in powder or with roasted ores of that metal; and, when required to produce zinc-lead pigment, it may be mixed with lead or lead ores.

The roasting should be at a moderate heat so as not to flux the materials. The object of the roasting is to drive off all acids and gases, and also to decompose or drive off any salts of iron, especially the chloride, which, if permitted to remain, would color the oxide produced so as to render it not merchantable.

By my process the oxide produced is equal to that from good zinc ore, while by the treatment of the ammoniacal skimmings by the wet process and subsequently precipitating the zinc oxide, as described in several English patents, only an inferior article has been produced or solutions of zinc salts suitable for use in coating metals. Besides, when lime or alkalies have been used in separating the acids from the zinc the resulting product is not in condition to be used in producing pure oxide. I especially avoid the addition of any fixed alkali to the dross or skimmings.

When the roasted ore has been mixed with the proper amount of coal I prefer to heat in a furnace so as to pass through or over it a stream of air, in the manner now commonly employed to produce oxide from zinc ores.

Having thus described my invention, what I claim as new, and desire to secure by Letters Patent, is—

1. The process herein described for purifying galvanizing dross or skimmings, consisting in grinding or crushing, sifting and roasting, substantially as set forth.

2. The process of producing oxide of zinc or other pigment from dross by roasting, mixing with coal, and subjecting to heat with a blast of air, substantially as set forth.

FRANKLIN OSGOOD.

Witnesses:
HENRY E. COLTON,
ROBERT REID.